United States Patent [19]

Hacke

[11] 4,076,477
[45] Feb. 28, 1978

[54] MULTIPLE EXTRUSION APPARATUS
[75] Inventor: Gerhard A. Hacke, Acton, Canada
[73] Assignee: Grandview Industries Limited, Canada
[21] Appl. No.: 638,459
[22] Filed: Dec. 8, 1975
[51] Int. Cl.² .............................................. B29F 3/06
[52] U.S. Cl. .............................. 425/192 R; 425/382 R; 425/464
[58] Field of Search ..................... 425/382, 464, 382.2, 425/463, 381, 380, 467, 190, 191, 192

[56] References Cited

U.S. PATENT DOCUMENTS

| 3,193,878 | 7/1965  | Corbett ......................... 425/382    |
| 3,256,563 | 6/1966  | Criss et al. ................... 425/464 X  |
| 3,561,053 | 2/1971  | Pearson ........................ 425/382 X  |
| 3,702,226 | 11/1972 | Kim et al. ..................... 425/382 X  |

FOREIGN PATENT DOCUMENTS

| 2,039,735 | 8/1970  | Germany ........................ 425/467 |
| 2,007,171 | 9/1971  | Germany ........................ 425/382 |
| 2,020,946 | 11/1971 | Germany ........................ 425/382 |
| 1,082,536 | 9/1967  | United Kingdom ................. 425/192 |

Primary Examiner—Francis S. Husar
Assistant Examiner—Mark Rosenbaum
Attorney, Agent, or Firm—Roylance, Abrams, Berdo & Kaul

[57] ABSTRACT

A plurality of extrusion dies are operated from the same source of heat-plastified polymeric material, e.g., from a single barrel extruder, via a distribution manifold which includes forwardly diverging flow passages each leading to a different one of the dies. The flow passages of the manifold have equal flow capacities and compensation for differences between the extrusion dies is accomplished by equipping each die assembly with a replaceable flow control insert, the inserts being so dimensioned that the pressure differential across each die assembly, including the insert, is the same.

4 Claims, 8 Drawing Figures

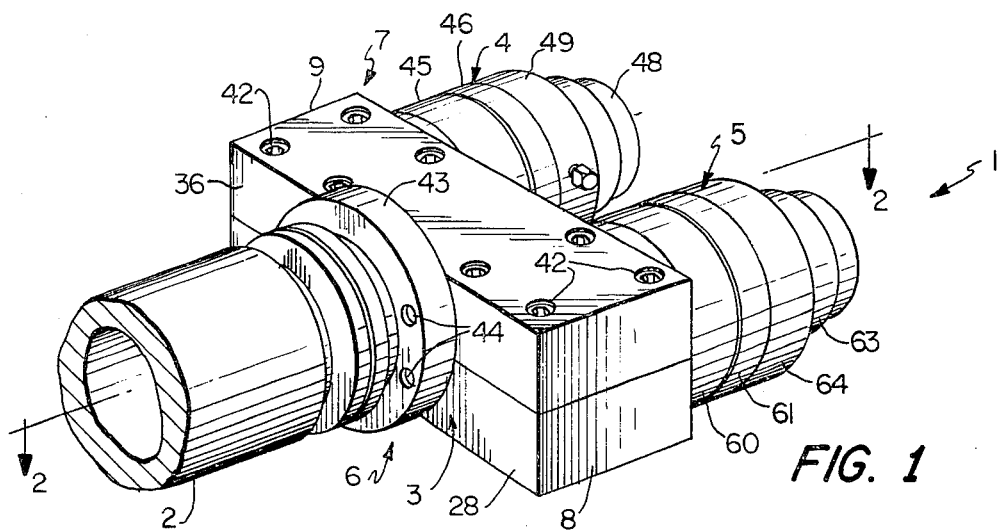
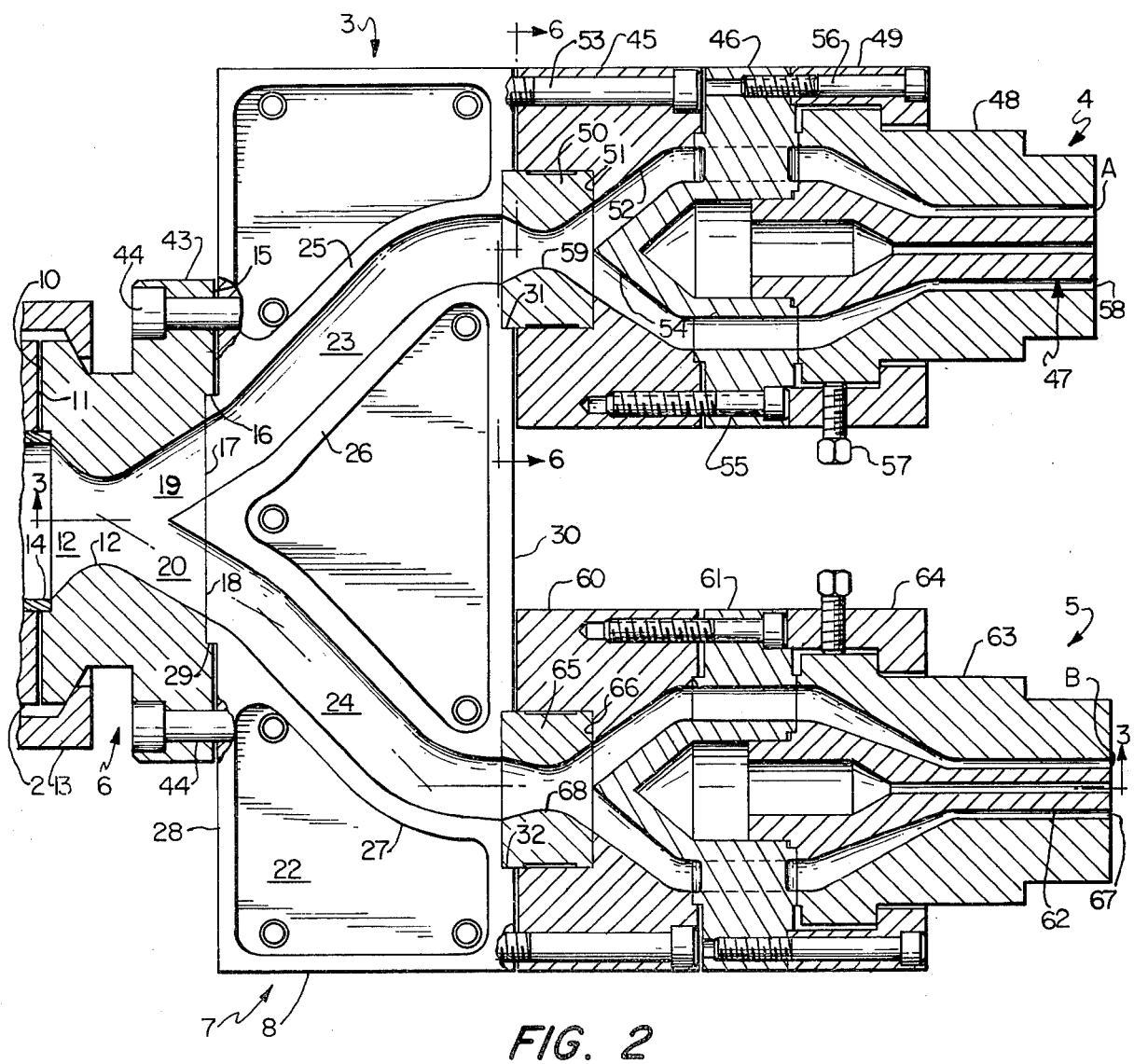
FIG. 1
FIG. 2

MULTIPLE EXTRUSION APPARATUS

BACKGROUND OF THE INVENTION

Many products are fabricated from polymeric materials by extrusion of the polymeric material while the material is in the heat-plastified state. Typical of such procedures is the melt extrusion of pipe, electrical conduit, and the like, and the extrusion of parisons in blow molding operations. Though the size of the product being formed is frequently such that a single extrusion die handles the total output of the extruder, it has long been recognized that, for some products, one extruder can supply the heat-plastified material at a rate adequate for two, or even more, dies. Thus, for example, an extruder can be equipped with two pipe extrusion dies, one for 2 in. dia. pipe, the other for 1½ in. dia. pipe, and pipe of the two sizes can be extruded simultaneously.

Such simultaneous extrusion presents the problem of accomplishing the appropriate flow rate of polymeric material through each die. If the apparatus were to be used only to produce, e.g., two specified products, such as 2 in. and 1½ in. polyvinyl chloride pipe, only two specific dies would be used and it would be possible to so design and construct the apparatus that operation of the extruder would always supply each die with plastified polymeric material at the rate appropriate for that die. In actual practice, however, it is necessary to achieve greater flexibility of production, and it is desirable to be able to use the extruder to produce a wider variation of products. Thus, for example, an extruder may be used to produce a 2 in. pipe and a 1½ in. pipe simultaneously over one period of time, then to produce two 2 in. pipes simultaneously, and then to simultaneously produce pipes of entirely different diameters. To provide such flexibility of operation, and to achieve precise control of the flow to each die, prior-art workers have found it necessary to equip each die with an adjustable flow control valve. Such arrangements are disclosed, for example, in U.S. Pat. Nos. 2,653,352, 2,740,989, 2,952,873, 2,980,955, 3,046,602 and 3,193,878. See also *Processing of Thermoplastic Materials*, Ernest C. Bernhardt, 1959, Reinhold Publishing Corp., New York, New York, pages 246–248.

While apparatus employing multiple dies each equipped with an adjustable flow control valve have achieved considerable acceptance in the trade, use of a valve under the circumstances of melt extrusion, for example, is not a completely satisfactory procedure, and there has been a continuing need for improvement in apparatus of this general type.

OBJECTS OF THE INVENTION

A general object is to provide an apparatus for simultaneously forming two products from heat-plastified polymeric material from a single supply, such as the output of a conventional extruder barrel, with each product forming means receiving its appropriate quantity of polymeric material, without the use of adjustable flow control valves.

Another object is to devise a multiple extrusion die apparatus in which the dies receive polymeric material at predetermined appropriate flow rates, without need for valving, and with the capability of rapid change of the extrusion dies to allow a wide range of flexibility in production from a single extruder.

SUMMARY OF THE INVENTION

Broadly considered, apparatus according to the invention is characterized by a distribution manifold which divides the extruder output into two or more separate flow paths each having the same flow capacity, each path leading to a different one of a plurality of die assemblies, each die assembly including an adapter body via which the die assembly is secured to the manifold, and a flow control insert confined by the adapter body, the flow control inserts being of such size and configuration as to assure that the pressure drop across the die assembly, including the insert, is the same for all of the die assemblies.

In order that the manner in which the foregoing and other objects are achieved according to the invention can be understood in detail, one particularly advantageous embodiment thereof will be described with reference to the accompanying drawings, which form part of the original disclosure of this application, and wherein:

FIG. 1 is a perspective view of a dual extrusion die assembly according to one embodiment of the invention;

FIG. 2 is a longitudinal sectional view taken generally on line 2—2, Fig. 3;

DETAILED DESCRIPTION

As seen in FIG. 1, the embodiment of the invention illustrated is a dual extrusion die assembly 1 mounted on the delivery end of barrel 2 of a conventional screw extruder. Assembly 1 includes a manifold, indicated generally at 3, and two die assemblies indicated respectively at 4 and 5.

Figure 3:
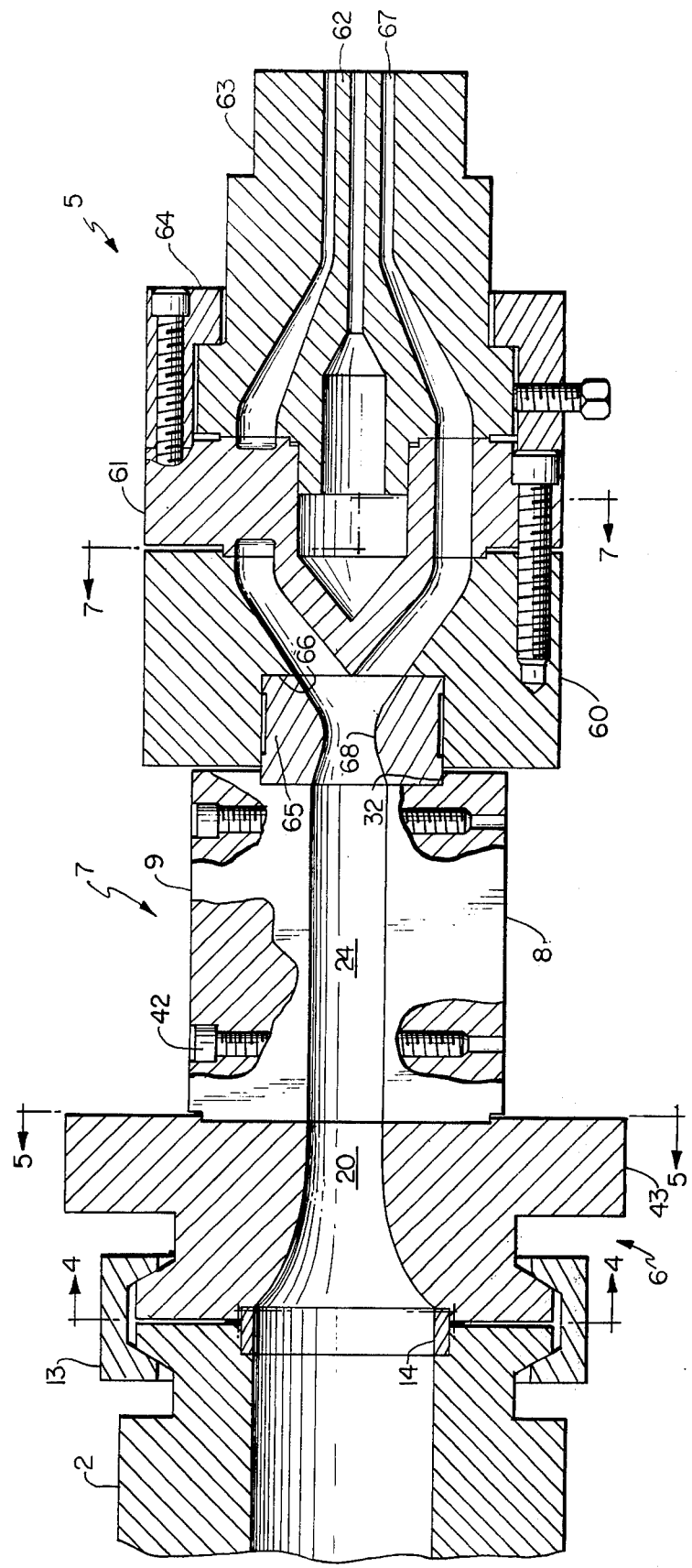
FIG. 3 is a longitudinal sectional view taken generally on line 3—3, FIG. 2.
Figure 4:
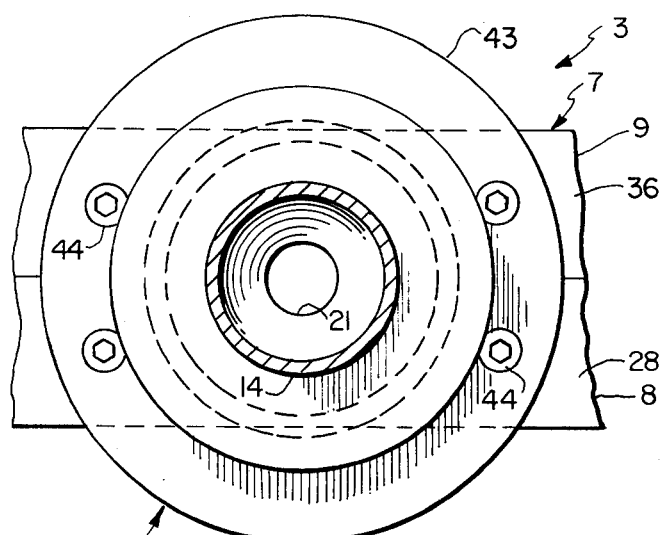
FIGS. 4–7 are transverse sectional views taken generally on lines 4—4, 5—5, 6—6 and 7—7, FIG. 3, respectively.
Figure 6:
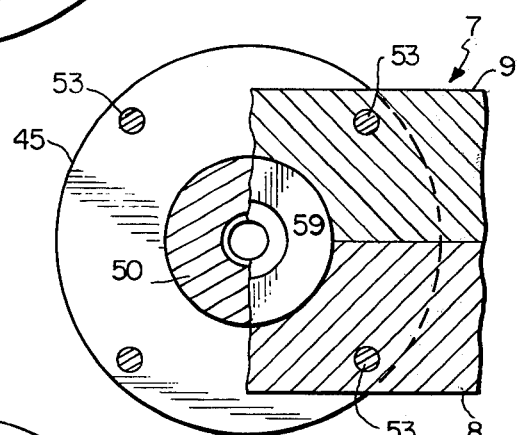
Figure 5:
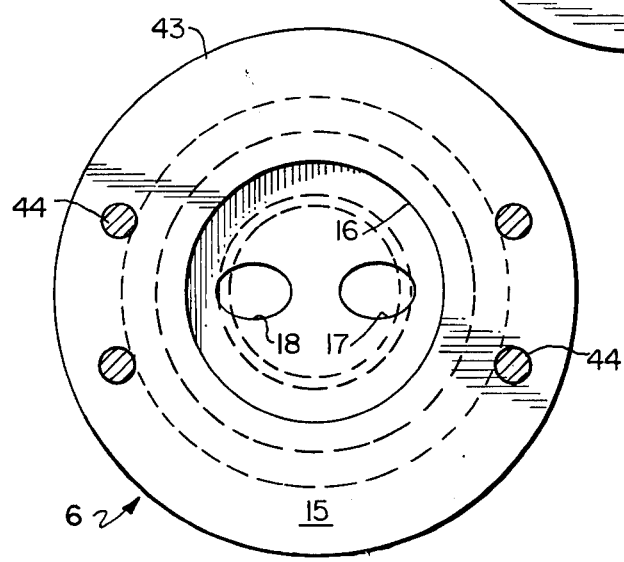
Figure 7:
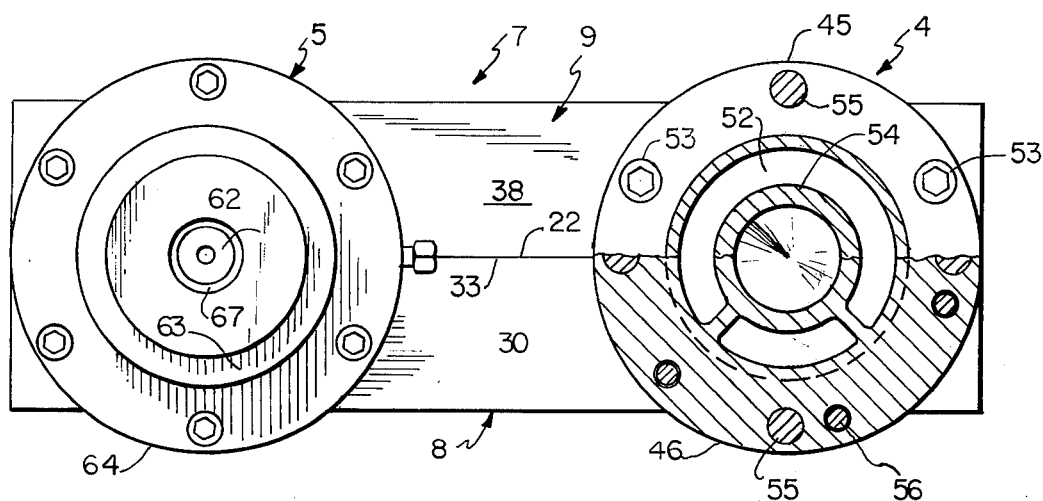
Figure 8:
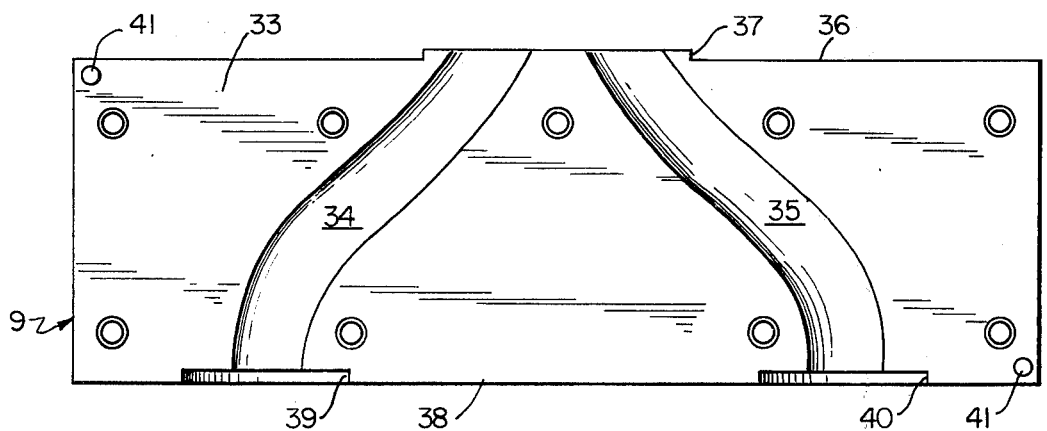
FIG. 8 is a bottom plan view of the upper half member of a manifold employed in the apparatus of FIGS. 1-7.

Manifold 3 includes an annular adapter body 6 and a main body 7, the latter being rectangular in plan and side elevations and comprising two half members 8 and 9, FIGS. 2 and 3. Adapter body 6 has a flat circular rear face 10, FIG. 4, matching the front face of end 11 of the extruder barrel. Face 10 has a circular inlet opening 12 of the same diameter as the bore of the extruder barrel. Adapter body 6 is secured directly to the extruder barrel, as by a conventional clamping ring 13, and the adjacent portions of the end of the extruder barrel and the adapter body are provided with annular recesses to accommodate a conventional seal ring 14. Front face 15 of adapter body 6 is flat, circular and provided with a circular forwardly opening recess 16 which surrounds two smaller circular outlet openings 17 and 18, FIG. 5. As shown in FIG. 2, openings 17 and 18 communicate with inlet opening 12 via forwardly diverging passage portions 19 and 20, respectively. Body 6 defines a circular, longitudinally rounded throat 21, FIG. 2, of smaller diameter than inlet opening 12. Outlet openings 17 and 18 are spaced apart across, and equidistant from, the central longitudinal axis of the adapter body.

In this embodiment, main manifold body 7 is horizontal, and die assemblies 4 and 5 are spaced apart horizontally, each on a different side of the longitudinal axis of the extruder barrel. The upper face 22, FIG. 2, of the lower half body member 8 is formed with two forwardly diverging channels 23 and 24 of semicircular transverse cross section, and with shallow relieved areas defined by edges 25-27. Rear face 28 of member 8 is flat and is interrupted by a semi-circular boss 29 of a diameter to be snugly embraced by the wall of recess 16 of adapter body 6, the inlet ends of channels 23, 24 opening through boss 29. Front face 30 of member 8 is flat and is interrupted by two forwardly opening semicircular recesses 31 and 32 so located that the outlet end of channel 23 opens through recess 31 and the outlet end of channel 24 opens through recess 32. Body member 9 is complementary to member 8 in all respects save that the bottom face 33 thereof is not provided with relieved areas corresponding to those defined by edges 25-27 on member 8. Thus, bottom face 33 of member 9 is formed with two forwardly diverging channels 34 and 35 which are of semicircular transverse cross section and in all respects complementary to the channels 23 and 24, respectively, of member 8. Rear face 36 of member 9 is flat and interrupted by semicircular boss 37 of the same diameter as boss 29, the inlet ends of channels 34 and 35 opening through the boss 37. Front face 38 of member 9 is flat and interrupted by two forwardly opening semicircular recesses 39 and 40 so located that the outlet end of channel 34 opens through recess 39 and the outlet end of channel 35 opens through recess 40.

To assure precise registration of body 8 with body 9, locator dowels 41 are employed. Bodies 8 and 9 are clamped rigidly together by socket head cap screws 42. With bodies 8 and 9 thus assembled, channels 23 and 34 combine to define a flow passage leading forwardly through the main body of the manifold, and channels 24 and 35 combine to define a second such passage. Similarly, bosses 29 and 37 combine to define a complete cylindrical boss, recesses 31 and 39 combine to define a complete circular recess, and recesses 32 and 40 combine to define a complete circular recess. The forward end of adapter body 6 includes an outwardly projecting transverse annular flange 43. Main manifold body 7 is secured to adapter body 6 by means of four cap screws 44, FIGS. 2 and 4, extending forwardly through flange 43.

Die assembly 4 provides a pipe extrusion die and comprises an adapter body 45, FIG. 2, spider body 46, a pin 47 carried by the spider body, an annular die body 48, a clamp ring 49, and a flow control insert 50. Adapter body 45 is annular and formed with a rearwardly opening cylindrical recess 51, to accommodate insert 50, and forwardly and outwardly tapering inner wall portion 52. Adapter body 45 is secured rigidly to the front face of main manifold body 7 by cap screws 53 which extend rearwardly through body 45 and are engaged in threaded bores in manifold bodies 8 and 9. Insert 50 is longer than is recess 51 so that, when body 45 is secured as shown, insert 50 projects beyond the flat rear face of the adapter body and fills the forwardly opening recess defined by cooperating semicircular recesses 31 and 39. The spider of body 46 supports a centrally disposed rearwardly and inwardly tapering portion 54 which is spaced concentrically inwardly from inner wall portion 52 of the adapter body to define an annular flow passage leading to the spider body passage. Spider body 46 is secured rigidly to adapter body 45 by cap screws 55. Pin 47 is rigidly secured to the hub of the spider body in conventional fashion. Die body 48 is secured to spider body 46 by clamping ring 49 and cap screws 56 which extend rearwardly through the clamping ring to engage in threaded bores in the spider body. Radial adjusting screws 57 are carried by ring 49 for centering of die body 48. Pin 47 and annular die body 48 cooperate to define an extrusion orifice 58 for forming pipe of predetermined diameter and wall thickness.

Flow control insert 50 defines a flow passage of circular transverse cross section, the diameter of the passage at the end thereof engaged with manifold body 7 being equal to the diameter of the outlet end of the passage defined by channels 23 and 34. At its forward end, the passage defined by insert 50 has a diameter equal to that of the cooperating end of wall portion 52. Intermediate its ends, the passage through insert 50 defines a throat 59 of a diameter smaller than that at either end of the insert. The portions of the passage through the insert between throat 59 and the ends of the insert are smoothly tapered to blend with the adjoining passage portions.

Die assembly 5 provides a pipe extrusion die and, save for dimensions, is identical to die assembly 4. Thus, die assembly 5 comprises an adapter body 60, a spider body 61, a pin 62, an annular die body 63, a clamp ring 64, and a flow control insert 65. Insert 65 has the same outer diameter and length as flow control insert 50 of assembly 4, and adapter body 60 has a rearwardly opening recess 66 identical to the recess 51 in body 45. Adapter body 60 is secured to main manifold body 7 by cap screws in the same manner as hereinbefore described for body 45. Similarly, spider body 61 is secured to adapter body 60, and the annular die body 63 is fixed in place by ring 64 which is secured to the spider body by cap screws. Pin 62 and annular die body 63 cooperate to define an extrusion orifice 67 for forming pipe of a predetermined diameter smaller than that of the pipe formed by orifice 58. Insert 65 has a through passage commencing, at its inlet, with a diameter equal to that of the passage defined by channels 24 and 35, and ending at the outlet end of the insert with a diameter equal to that of the adjoining portion of the inner wall of the adapter body. Intermediate its ends, the passage defined by insert 65 defines a throat 68 of smaller diameter than the inlet and outlet ends of the passage defined by the insert.

The flow passage defined by channels 23 and 34 and the flow passage defined by channels 24 and 35 are of the same diameter, length and curvature and therefore have the same flow capacity. Extrusion orifice 58 has a significantly larger cross-sectional area than does extrusion orifice 67. Hence, were it not for flow control inserts 50 and 65, the output of extruder barrel 2 would be diverted through die assembly 4, so that there would be inadequate extrusion via die assembly 5. However, throat 68 of insert 65 has a larger diameter than does throat 59 of insert 50, the relative sizes of the insert throats being chosen to assure that the simultaneous flow rates of heat-plastified polymeric material through the two die assemblies will be optimum for the respective dies, with the pressure drop from the inlet of the flow control insert to the outlet of the extrusion orifice being identical for both dies.

Adapter bodies 45 and 60 are identical, as are spider bodies 46 and 61. The size and nature of the extruded product can be changed by substituting different pins and annular die bodies, and then selecting corresponding flow control inserts to preserve the equality of pressure drops across the two dies. In this connection, it will be noted that the external dimensions of the flow control inserts are the same, so that any of a number of flow control inserts can be accommodated by the adapter bodies 45 and 60.

For simplicity of illustration, the heating bands conventionally associated with the bodies of the die assemblies 4 and 5 and the heating plates conventionally associated with the main manifold body have been omitted.

What is claimed is:

1. In apparatus for simultaneously forming two products from heat-plastified polymeric material supplied from a single supply orifice such as that at the delivery end of an extruder barrel, the combination of
    distribution manifold means adapted to be mounted to receive the heat-plastified polymeric material from the supply orifice, said manifold means defining
        at least two forwardly diverging flow passages having a common inlet to communicate with the supply orifice,
        said flow passages being of the same flow capacity; and
    a plurality of die assemblies equal in number to said flow passages, each of said die assemblies comprising
        an annular adapter body secured to the forward end of said manifold means in registry with the outlet of one of said flow passages,
        an annular die body mounted on the adaptor body and arranged to receive the heat-plastified polymeric material flowing through the adapter body,
        means operatively associated with said die assembly for securing the die assembly to the forward end of the manifold means,
        said adapter body having a rearwardly opening cavity, and
        a replaceable annular flow control insert disposed in said rearwardly opening cavity of the adapter body and communicating between the corresponding one of said flow passages and the interior of the die body; said flow control inserts being so dimensioned and of such shape that the pressure drop across the entire die assembly, including the flow control insert, is the same for all of the die assemblies.

2. The combination defined in claim 1, wherein
    said manifold means has a plurality of forwardly opening recesses each located at the outlet of a different one of said flow passages and each coaxial with the rearwardly opening cavity of the corresponding one of said adapter bodies when the die assemblies are secured to the manifold means; and
    said flow control inserts are of greater axial dimension than said rearwardly opening cavities, whereby each of said flow control inserts is retained by the combination of one of said rearwardly opening cavities and one of said forwardly opening recesses.

3. The combination defined in claim 1, wherein
    said manifold means comprises
        an adapter body secured to the delivery end of an extruder barrel, and
        a main manifold body;
    said adapter body of the manifold means having
        a flat rear face with a single circular inlet opening to register with the supply orifice,
        a flat front face with two outlet openings spaced apart across the longitudinal central axis of the manifold means, and
        two forwardly diverging passage portions each communicating between said single inlet opening and a different one of said outlet openings;
    said main manifold body comprises
        two body halves each having a flat face, and
        means securing said body halves together with said flat faces in mutual engagement,
        each of said body halves having forwardly divergent channels of semicircular transverse cross section formed in said flat surfaces, whereby said body halves coact to define two forwardly flow passage portions each leading from a different one of said passage portions of said adapter body of the manifold means to a different one of said flow control inserts when the die assemblies are secured to the manifold means.

4. In a dual extrusion assembly, the combination of
    a manifold adapter body constructed and arranged to be mounted on the delivery end of an extruder barrel, said manifold adapter body having
        an inlet opening to receive plastified polymeric material from the extruder barrel.
        two outlet openings disposed each on a different side of the longitudinal central axis of the manifold adapter body,
        two forwardly divergent flow passages each communicating between said inlet opening and a different one of said outlet openings, and
        a transverse mounting flange at the forward end of the manifold body;
    a main manifold having a rear face and a forward face and comprising
        two members each having a flat face, each of said flat faces being provided with two forwardly diverging channels, said members being disposed with said flat faces in mutual engagement and said forwardly diverging channels of one member cooperating with said forwardly diverging channels of the other to define two forwardly diverging flow passages, and
        means securing said two members together;
    first removable fastener means carried by said mounting flange of said manifold adapter body and securing said main manifold rigidly to said manifold adapter body,
    said forwardly diverging flow passages defined by said channels each having an input end at the rear face of said main manifold and an output end at the forward face of said main manifold,
    said input ends of the flow passages defined by said channels each being registered with the output end of a different one of said flow passages of said adapter body;
    two extrusion die assemblies each comprising
        a die adapter body having a rearwardly opening recess and an annular flow-confining wall portion extending forwardly from said recess,
        a flow control disposed in said recess and having a through passage,
        means located forwardly of said die adapter body and defining a die orifice, and
        flow confining means associated with said die adapter body for conducting plastified polymeric material from said die adapter body forwardly to said die orifice; and
    second removable fastener means rigidly securing said die adapter bodies to the forward face of said main manifold with said flow control inserts clamped between the respective die adapter bodies and said main manifold and each having its through passage registered with the output end of a different one of the flow passages defined by said channels, said forwardly diverging passages defined by said channels having the same flow capacity, the through passages of said flow control inserts each including a throat of smaller transverse area than the outlets of the flow passages defined by said channels, the pressure drop across both extrusion die assemblies, measured from the inlet of the flow control insert to the outlet of the die orifice, being substantially the same.

* * * * *